(12) United States Patent
Yuzawa

(10) Patent No.: US 11,474,477 B2
(45) Date of Patent: Oct. 18, 2022

(54) IMAGE FORMING APPARATUS

(71) Applicant: CANON KABUSHIKI KAISHA, Tokyo (JP)

(72) Inventor: Atsuyuki Yuzawa, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/704,337

(22) Filed: Dec. 5, 2019

(65) Prior Publication Data

US 2020/0110354 A1   Apr. 9, 2020

Related U.S. Application Data

(63) Continuation of application No. 16/158,078, filed on Oct. 11, 2018, now Pat. No. 10,528,002, which is a (Continued)

(30) Foreign Application Priority Data

Nov. 29, 2012 (JP) .................................. 2012-261449

(51) Int. Cl.
*G03G 21/16* (2006.01)
*H04N 1/00* (2006.01)
(Continued)

(52) U.S. Cl.
CPC ..... *G03G 21/1657* (2013.01); *G03G 15/5087* (2013.01); *H04B 5/0031* (2013.01); (Continued)

(58) Field of Classification Search
CPC .. G03G 21/1657; G03G 15/5087; H04N 1/04; H04N 1/00127; H04N 1/00315; (Continued)

(56) References Cited

U.S. PATENT DOCUMENTS

| 9,836,019 B2 * | 12/2017 | Yuzawa ............... H04B 5/0031 |
| 2002/0030835 A1 * | 3/2002 | Tanizawa ........... H04N 1/00127 |
| | | 358/1.9 |
| 2012/0308243 A1 * | 12/2012 | Kawasumi ......... G03G 21/1619 |
| | | 399/13 |

FOREIGN PATENT DOCUMENTS

JP           2014-106481 A        6/2014

* cited by examiner

*Primary Examiner* — Andrew H Lam
(74) *Attorney, Agent, or Firm* — Canon U.S.A., Inc. I.P. Division

(57) ABSTRACT

An image forming apparatus includes a communication portion arranged inside a cover covering an image forming portion in the main body of the apparatus and including an antenna surface for use in establishing near field communication. The cover includes a stacking portion in its upper section. The stacking portion is configured to receive a recording medium with an image thereon, the recording medium being discharged outside the main body of the apparatus. The antenna surface faces a region of the upper section of the cover downstream in a direction of discharging the recording medium. The antenna surface at least partially faces a region of the upper section of the cover outside the stacking portion in a direction perpendicular to the direction of discharging the recording medium. The communication portion is capable of communicating with another communication portion using near field communication.

60 Claims, 13 Drawing Sheets

Related U.S. Application Data continuation of application No. 15/797,946, filed on Oct. 30, 2017, now Pat. No. 10,126,703, which is a continuation of application No. 15/398,323, filed on Jan. 4, 2017, now Pat. No. 9,836,019, which is a continuation of application No. 14/818,738, filed on Aug. 5, 2015, now Pat. No. 9,703,256, which is a continuation of application No. 14/090,481, filed on Nov. 26, 2013, now Pat. No. 9,131,086.

(51) Int. Cl.
*H04B 5/00* (2006.01)
*G03G 15/00* (2006.01)
*H04N 1/04* (2006.01)

(52) U.S. Cl.
CPC ..... *H04N 1/00127* (2013.01); *H04N 1/00315* (2013.01); *H04N 1/04* (2013.01); *H04N 2201/006* (2013.01); *H04N 2201/0055* (2013.01); *H04N 2201/0081* (2013.01); *H04N 2201/0082* (2013.01)

(58) Field of Classification Search
CPC ... H04N 2201/0055; H04N 2201/0081; H04N 2201/006; H04N 2201/0082; H04B 5/0031
USPC .......................................................... 399/81
See application file for complete search history.

SHEET DISCHARGE AREA

SHEET DISCHARGE AREA

IMAGE FORMING APPARATUS

CROSS-REFERENCE TO RELATED APPLICATION

This application is a Continuation of U.S. application Ser. No. 16/158,078, filed Oct. 11, 2018; which is a Continuation of U.S. application Ser. No. 15/797,946, filed Oct. 30, 2017, which now becomes U.S. Pat. No. 10,126,703, issued Nov. 13, 2018; which is a Continuation of U.S. application Ser. No. 15/398,323, filed Jan. 4, 2017, which now becomes U.S. Pat. No. 9,836,019, issued Dec. 5, 2017, which claims the benefit of Continuation of U.S. application Ser. No. 14/818,738, filed Aug. 5, 2015, which now becomes U.S. Pat. No. 9,703,256, issued Jul. 11, 2017, which claims the benefit of U.S. application Ser. No. 14/090,481, filed Nov. 26, 2013 which now becomes U.S. Pat. No. 9,131,086 issued Sep. 8, 2015; which claims the benefit of Japanese Patent Application No. 2012-261449 filed Nov. 29, 2012, which are hereby incorporated by reference herein in its entirety.

BACKGROUND OF THE INVENTION

Field of the Invention

The present invention relates to an image forming apparatus, such as a laser beam printer or a copier, for forming an image on a recording medium.

Description of the Related Art

There is an image forming apparatus capable of receiving image data to be printed from an information device, such as a personal computer or a cellular phone, using wireless communication and of forming an image based on the image data. Such an image forming apparatus includes a communication portion for establishing wireless communication.

Japanese Patent Laid-Open No. 2006-53477 describes arrangement of a reception portion (communication portion) for wireless communication in the main body of an image forming apparatus.

However, Japanese Patent Laid-Open No. 2006-53477 does not disclose an appropriate location and orientation of the communication portion in the case where the communication portion is used in, so-called near field communication (NFC), which is a communication with a relatively short distance over which data is capable of being wirelessly communicated and where it is possible for the first time to establish communication by a user passing an information device that is to communicate with the image forming apparatus over a location that faces the communication portion of the image forming apparatus.

SUMMARY OF THE INVENTION

The present disclosure provides appropriately arranging a communication portion for use in establishing near field communication in an image forming apparatus while at the same time achieving satisfactory communication performance and usability.

The embodiments of the present disclosure can provide image forming apparatuses described below.

The embodiments of the present disclosure can provide an image forming apparatus including an image forming portion, a cover, and a communication portion. The cover covers the image forming portion and includes a stacking portion disposed in an upper portion of the cover and configured to receive a recording medium thereon, the recording medium having an image formed by the image forming portion and being discharged outside a main body of the image forming apparatus. The communication portion is arranged inside the cover in the main body of the image forming apparatus and includes an antenna surface for use in establishing a near field communication. The antenna surface faces a region of the upper section of the cover, the region being downstream in a direction of discharging the recording medium. The antenna surface at least partially faces a region of the upper section of the cover, the region being outside the stacking portion in a direction perpendicular to the direction of discharging the recording medium. The communication portion is used for communicating with another communication portion using near field communication.

Embodiments discussed herein can provide an image forming apparatus including an image forming portion, a cover, a communication portion, and an operating portion. The cover covers the image forming portion and includes a stacking portion disposed in an upper portion of the cover and configured to receive a recording medium thereon, the recording medium having an image formed by the image forming portion and being discharged outside a main body of the image forming apparatus. The communication portion is arranged inside the cover in the main body of the image forming apparatus and includes an antenna surface for use in establishing a near field communication. The operating portion is used in manipulating operations of the image forming portion. The antenna surface faces the upper section of the cover in a position opposite the operating portion in a direction perpendicular to a direction of discharging the recording medium such that the stacking portion is disposed therebetween. The communication portion is used for communicating with another communication portion using near field communication.

The present disclosure can provide an image forming apparatus including an image forming portion, a cover, a communication portion, and a display portion. The cover covers the image forming portion and includes a stacking portion disposed in an upper portion of the cover and configured to receive a recording medium thereon, the recording medium having an image formed by the image forming portion and being discharged outside a main body of the image forming apparatus. The communication portion is arranged inside the cover in the main body of the image forming apparatus and includes an antenna surface for use in establishing a near field communication. The display portion is configured to display information relating to the image formation. The antenna surface faces the upper section of the cover in a position opposite the display portion in a direction perpendicular to a direction of discharging the recording medium such that the stacking portion is disposed therebetween. The communication portion is used for communicating with another communication portion using near field communication.

Embodiments discussed herein can provide an image forming apparatus including an image forming portion, a cover, a communication portion, and an image reading portion. The cover covers the image forming portion and includes a stacking portion disposed in an upper portion of the cover and configured to receive a recording medium thereon, the recording medium having an image formed by the image forming portion and being discharged outside a main body of the image forming apparatus. The communication portion is arranged inside the cover in the main body of the image forming apparatus and includes an antenna surface for use in establishing a near field communication. The image reading portion is configured to read an image on an original. The antenna surface faces the upper section of the cover and is arranged downstream of an end of the image reading portion in a direction of discharging the recording medium. The communication portion is used for communicating with another communication portion using near field communication.

Further features of the present invention will become apparent from the following description of exemplary embodiments with reference to the attached drawings.

DESCRIPTION OF THE EMBODIMENTS

First Embodiment

An embodiment of the present invention is described below. In the following description, when there is a plurality of devices having substantially the same configuration, such as photosensitive drums 10a, 10b, 10c, and 10d, they are indicated as a representative, such as a photosensitive drum 10, in describing the configuration and operations for the sake of simplification.

[Image Forming Portion]

Figure 3:
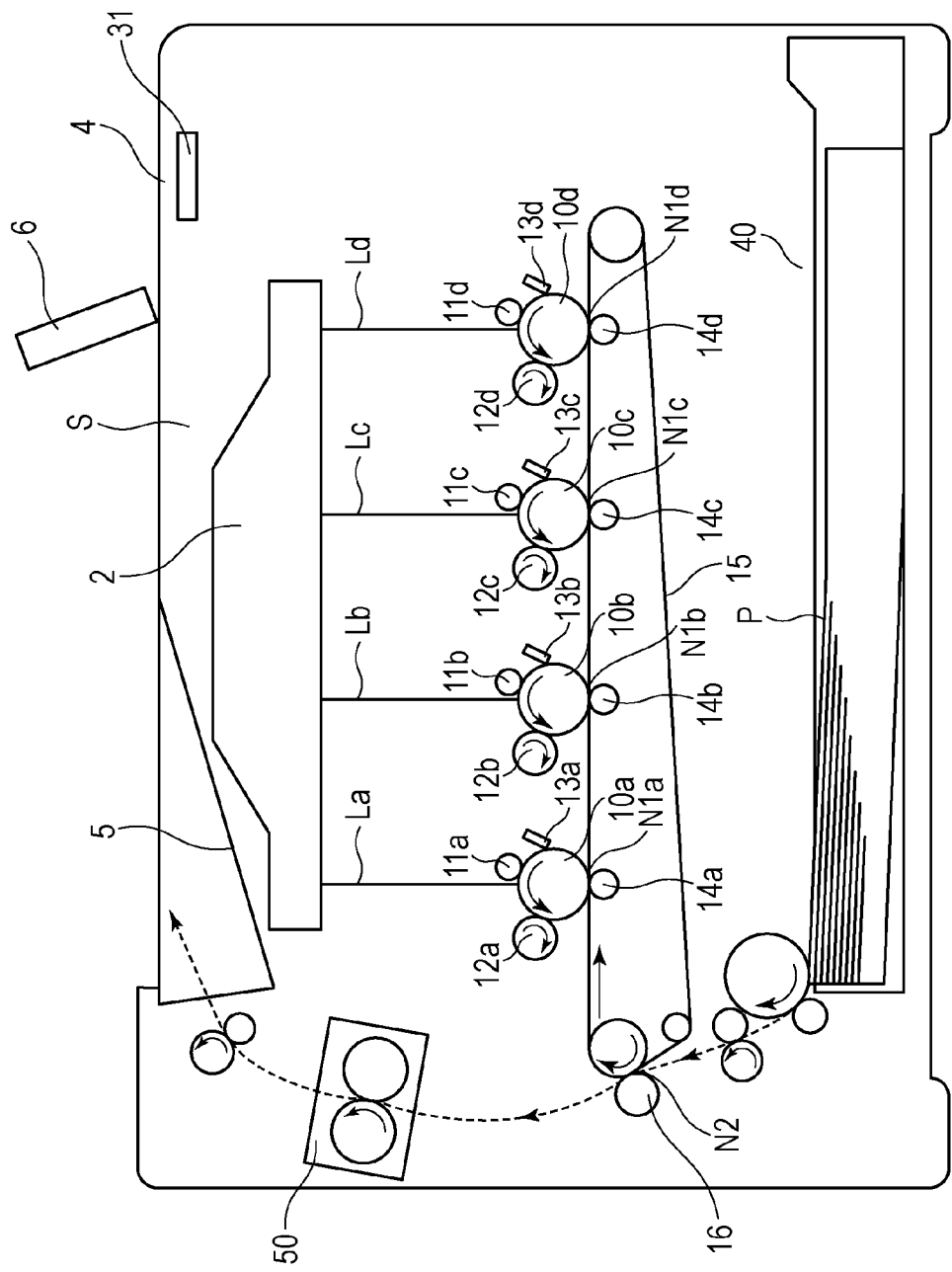
FIG. 3 is a schematic cross-sectional view of an image forming apparatus.

First, an image forming portion in the image forming apparatus is described. FIG. 3 is a schematic cross-sectional view of an image forming apparatus S. The image forming apparatus S is an electrophotographic tandem laser beam printer and can form a four-color image on a sheet recording medium, such as paper or OHP film.

The configuration of the image forming portion is described below. The image forming portion includes a drum-type electrophotographic photosensitive member (hereinafter referred to as "photosensitive drum") 10 (10a to 10d) for each color. The photosensitive drum 10 is rotatably supported in the image forming apparatus S and rotated by a driver (not illustrated) in the direction of the arrow. Process units arranged around the photosensitive drum 10 in its rotational direction are as follows: a charging roller 11 (11a to 11d) configured to charge the photosensitive drum 10, an exposure unit 2 configured to emit a laser beam L (La to Ld) based on image information to the photosensitive drum 10, a development roller 12 (12a to 12d) configured to attach toner to the surface of the photosensitive drum 10, an intermediate transfer belt (intermediate transfer member) 15 to which a toner image is primarily transferred from the photosensitive drum 10, and a cleaning blade 13 (13a to 13d) configured to eliminate toner on the surface of the photosensitive drum 10. The development rollers 12a to 12d are configured to attach different colors of toner (yellow, magenta, cyan, and black) to the photosensitive drums 10a to 10d, respectively.

The photosensitive drum 10 is the one in which a photoconductive layer, such as an organic photo conductor (OPC), is disposed on the outer surface of an aluminum cylinder. The charging roller 11 is made of a metal core with a conductive elastic member covering. The charging roller 11 is in contact with the surface of the photosensitive drum 10, is rotatable by following the rotation of the photosensitive drum 10, and configured to receive a charging bias applied by a power source (not illustrated). The exposure unit 2 accommodates, in its housing, laser light sources for emitting the laser beams La to Ld (not illustrated) and optical members for use in guiding the laser beams emitted from the laser light sources to the corresponding photosensitive drums 10a to 10d, in deflecting the laser beams, and in scanning the photosensitive drums 10a to 10d with the laser beams. The exposure unit 2 is configured to emit the laser beams La to Ld based on image information to the charged surfaces of the photosensitive drums 10a to 10d and form electrostatic latent images thereon. The development roller 12 is configured to attach toner to the electrostatic latent image on the surface of the photosensitive drum 10, develop the electrostatic latent image, and form a toner image on the surface of the photosensitive drum 10.

The intermediate transfer belt 15 is an endless loop belt, is placed around three mutually parallel stretching rollers, and is driven (travelled) by rotation of the stretching rollers such that its surface is moved in the direction of the arrow. A primary transfer roller 14 (14a to 14d) is arranged inside the loop of the intermediate transfer belt 15. The primary transfer roller 14 presses the intermediate transfer belt 15 against the surface of the photosensitive drum 10 and forms a primary transfer nip portion N1 (N1a to N1d) between the photosensitive drum 10 and the intermediate transfer belt 15.

The primary transfer roller 14 receives a primary transfer bias applied by the power source (not illustrated). A secondary transfer roller 16 is arranged downstream of the primary transfer nip portion N1 (N1a to N1d) in the direction of driving the intermediate transfer belt 15. A secondary transfer nip portion N2 is formed between the secondary transfer roller 16 and the intermediate transfer belt 15. The secondary transfer roller 16 is configured to receive a secondary transfer bias applied by the power source (not illustrated).

A paper feed unit 40 is configured to feed a recording medium P to the secondary transfer nip portion N2 and can store a plurality of recording media Ps.

A fixing device 50 is disposed downstream of the secondary transfer nip portion N2 in the direction of transporting the recording medium P (direction of the dotted arrows). The fixing device 50 is configured to heat and press the recording medium P and fix toner on the recording medium P.

The configuration described above functions as an image forming portion configured to form an image on the recording medium P. The image forming portion is covered by a cover 4 as an outer component.

[Image Forming Operation]

An image forming operation performed by the above-described image forming portion is described next. A toner image is formed on the surface of the photosensitive drum 10 through the process described below while the photosensitive drum 10 is rotated in the direction of the arrow. First, the surface of the photosensitive drum 10 is charged by being in contact with the charging roller 11 charged with the charging bias, and the surface of the photosensitive drum 10 becomes a predetermined potential. After that, the surface of the photosensitive drum 10 is radiated with the laser beam L based on image information from the exposure unit 2, and an electrostatic latent image is formed thereon. The electrostatic latent image formed on the surface of the photosensitive drum 10 is developed with toner attaching to the section radiated with the laser beam in a location that faces (is in contact with) the development roller 12, and the developed image appears as a toner image. With such an operation on each of the photosensitive drums 10a to 10d, different colors of toner images (yellow, magenta, cyan, and black) are formed on them, respectively.

The toner image on the photosensitive drum 10 is transferred to the intermediate transfer belt 15 at the primary transfer nip portion N1 by the action of the primary transfer bias applied on the primary transfer roller 14. The toner images on the photosensitive drums 10a to 10d are transferred to the intermediate transfer belt 15 with timings at which the toner images are superimposed. In this manner, a four-color toner image made up of the superimposed yellow, magenta, cyan, and black toner images is formed on the intermediate transfer belt 15. After the passage through the primary transfer nip portion N1, toner remaining on the photosensitive drum 10 is scraped by the cleaning blade 13 in a cleaner unit.

The toner image on the intermediate transfer belt 15 is transported to the secondary transfer nip portion N2 by rotation of the intermediate transfer belt 15. The toner image on the intermediate transfer belt 15 is transferred, at the secondary transfer nip portion N2 with adjusted timing, to the recording medium P transported to the secondary transfer nip portion N2 by the action of the secondary transfer bias applied to the secondary transfer roller 16.

The recording medium P with the toner image transferred thereto is transported to the fixing device 50. At the fixing device 50, the recording medium P is heated and pressed, and the toner image is fixed (fused and fixed) on the recording medium P. In this manner, the four-color image is formed on the recording medium P. After the passage through the secondary transfer nip portion N2, toner remaining on the surface of the intermediate transfer belt 15 is scraped by a belt cleaner (not illustrated).

Finally, the recording medium P having passed through the fixing device 50 is discharged outside the main body of the image forming apparatus S and stacked on a stacking portion 5 in the upper section of the cover 4, through which the recording medium P has passed. The operation described above is the image forming operation performed by the image forming portion.

An operation panel 6 as an operating portion including buttons for use in controlling and manipulating the image forming operation by the image forming portion is disposed on the upper section of the cover 4. The operation panel 6 also includes a display as a display portion capable of displaying information relating to image formation.

A communication portion 31 for establishing near field communication is disposed inside the cover 4.

[Communication Portion 31]

Figure 4A:
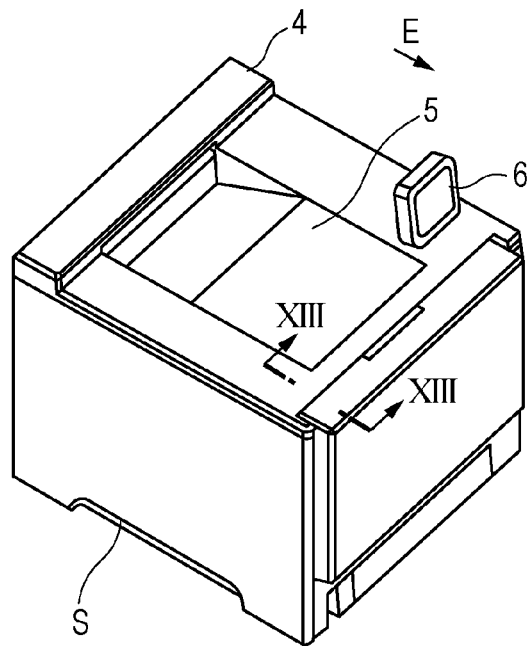
FIG. 4A is a perspective view of the image forming apparatus.
Figure 4B:
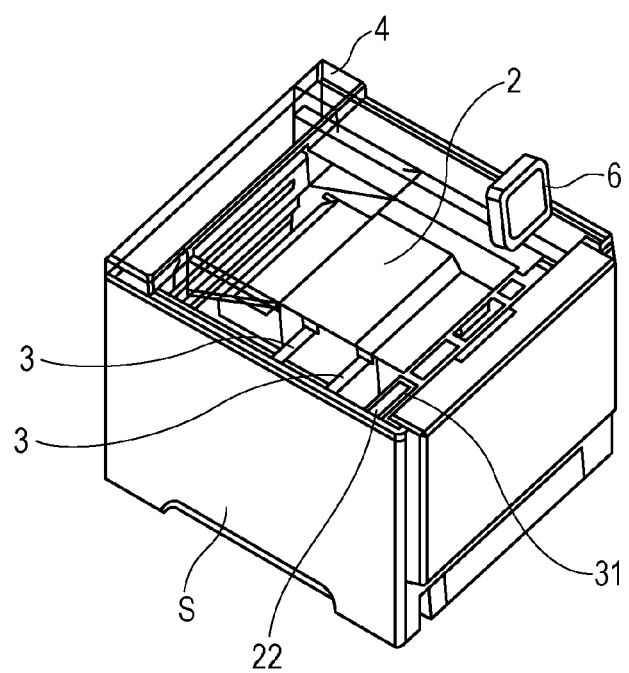
FIG. 4B illustrates the image forming apparatus in FIG. 4A when an upper section of a cover is assumed to be transparent.

The communication portion 31 is described next. FIG. 4A is a perspective view of the image forming apparatus S. FIG. 4B is an illustration in which the upper section of the cover 4 is assumed to be transparent to make the inside of the apparatus visible. As illustrated in FIGS. 4A and 4B, the communication portion 31 is disposed on the downstream side in the image forming apparatus S in the direction of discharging the recording medium P (E direction), that is, on the front side in the image forming apparatus S. The near field communication (NFC) is a set of short-range wireless communication standards where the communication distance is approximately 10 cm or less, typified by ISO/IEC 18092 and ISO/IEC 21481. Other examples of the standards include Felica (registered trademark) and MIFARE (registered trademark).

Figure 11A:
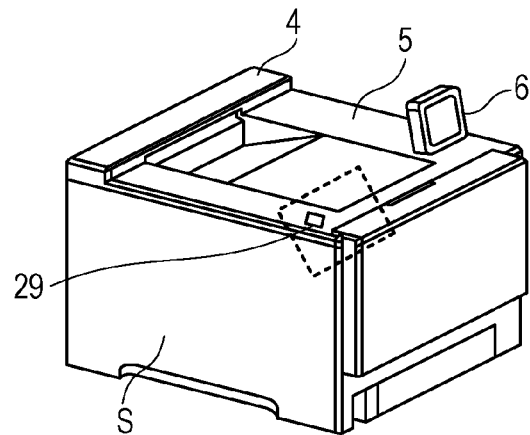
FIG. 11A is a perspective view of the image forming apparatus.
Figure 11B:
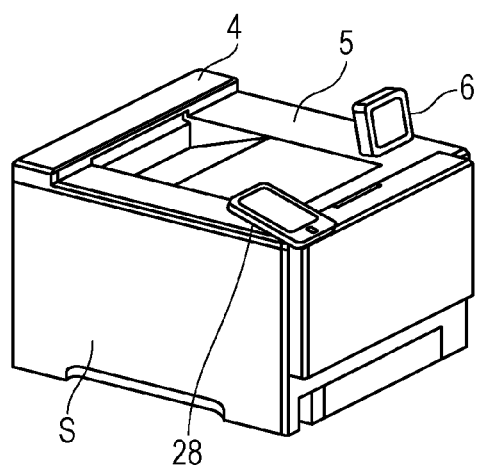
FIG. 11B is a perspective view of the image forming apparatus (in a state where a mobile terminal is passed)
Figure 11C:
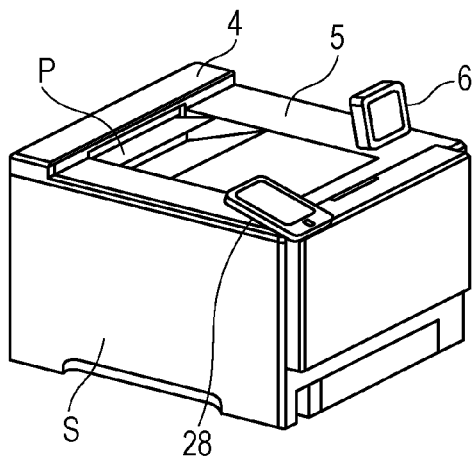
FIG. 11C is a perspective view of the image forming apparatus (in a state where a recording medium is discharged when the mobile terminal is passed).

A communication method using the communication portion 31 is described next. FIGS. 11A to 11C are perspective views of the image forming apparatus S. As illustrated in FIG. 11A, an icon (mark) 29 indicating that the communication portion 31 is disposed inside is present directly above the communication portion 31 on the upper section of the cover 4. The communication portion 31 is disposed in the section surrounded by the dotted lines in FIG. 11A.

A case is described below where a user instructs the image forming apparatus S to print data stored in a device, such as a mobile terminal, for example, a smartphone, that includes a communication portion for near field communication. The user first selects an image to be printed by the image forming apparatus S on a mobile terminal 28 and sets the mobile terminal 28 at a state where it can communicate. Next, as illustrated in FIG. 11B, the mobile terminal 28 is passed above the icon 29 on the upper section of the cover 4 and its vicinity, thus allowing the communication portion 31 in the image forming apparatus S and the communication portion incorporated in the mobile terminal 28 to communicate with each other. Then, the image data is transmitted from the communication portion in the mobile terminal 28 to the communication portion 31 in the image forming apparatus S using near field communication. The communication portion 31 in the image forming apparatus S receives the image data and transmits it to an image data processor (not illustrated) configured to process the image data. In response to this, the above-described image forming operation is performed in the image forming apparatus S, and the image transmitted from the mobile terminal 28 is printed on the recording medium P, and the recording medium P is discharged and stacked on the stacking portion 5, as illustrated in FIG. 11C. In this way, the image can be formed using the near field communication.

In addition to reception of the image data, the communication portion 31 may receive authentication data for use in starting the image forming operation and may transmit data for notifying completion of reception of the image data or other data. The device communicating with the communication portion 31 using near field communication may not be a mobile terminal, and it may be an IC card, for example.

[Arrangement of Communication Portion 31]

Figure 5A:
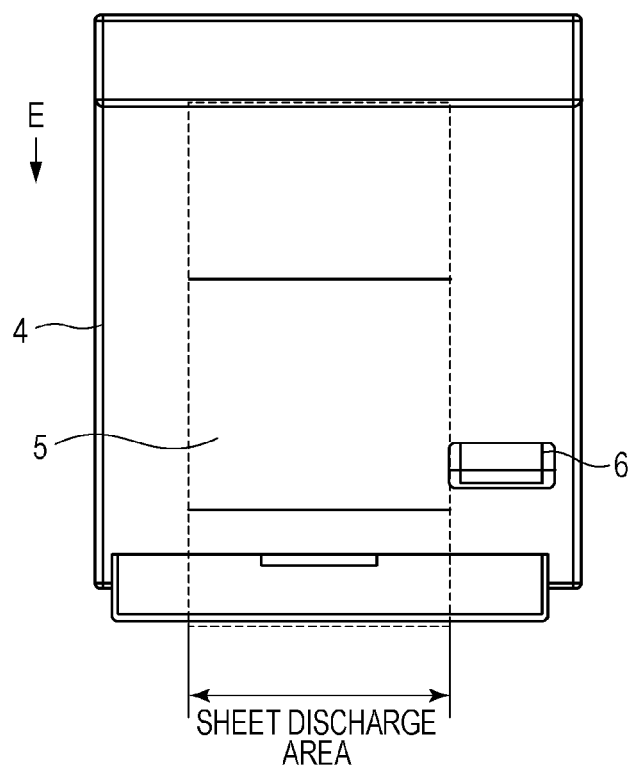
FIG. 5A is a top view of the image forming apparatus.
Figure 5B:
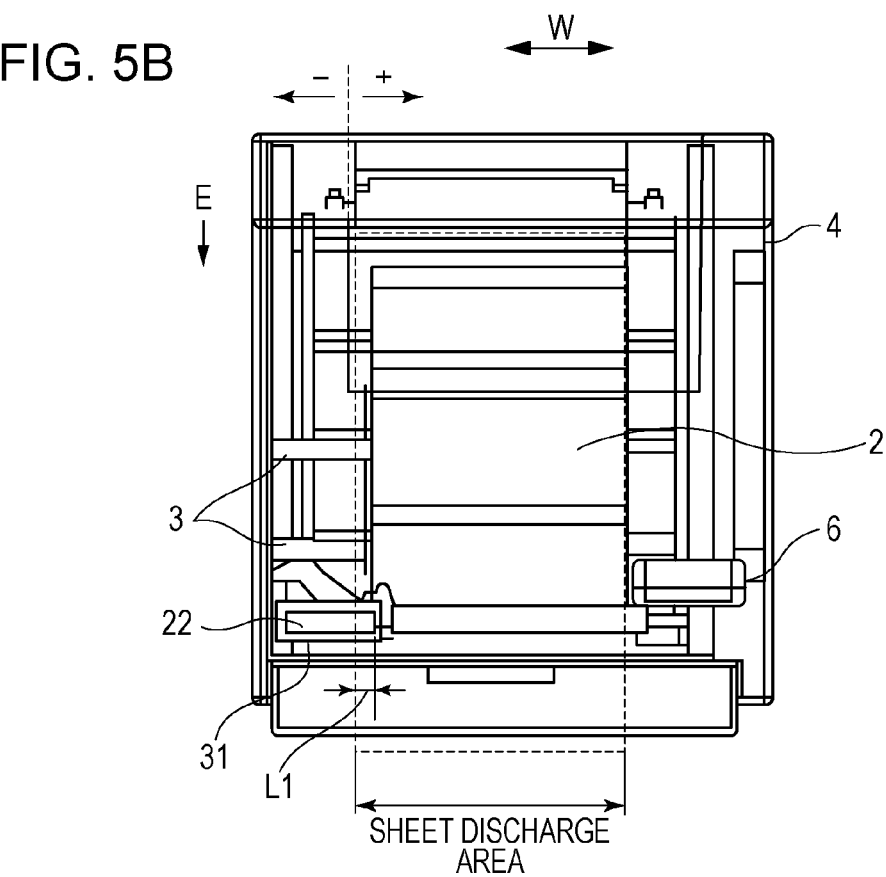
FIG. 5B illustrates the image forming apparatus in FIG. 5A when the upper section of the cover is assumed to be transparent.

Arrangement of the communication portion 31 is described next with reference to FIGS. 4B, 5A, and 5B. FIG. 5A is a top view of the image forming apparatus S. FIG. 5B is a top view of the image forming apparatus S when the upper section of the cover 4 is assumed to be transparent. The communication portion 31 is a substrate that includes an antenna surface 22 and is electrically connected to a controller configured to control the image forming operation. The antenna surface 22 receives information transmitted from a communication portion that is to communicate with the image forming apparatus S in the mobile terminal 28 or the like. The antenna surface 22 in the communication portion 31 is disposed substantially in parallel to the upper section of the cover 4. The communication portion 31 is arranged on the downstream side in the image forming apparatus S in the direction of discharging the recording medium P (E direction), as described above. Thus, a user can easily pass the communication portion that is to communicate with the image forming apparatus in the mobile terminal 28 or the like over the communication portion 31 in the image forming apparatus, in which the direction of discharging the recording medium P is on the front side.

The communication portion 31 is arranged on the left side in the sheet discharge area being the stacking portion 5 in the upper section of the cover 4 in the width direction (W direction), which is perpendicular to the discharge direction, in the image forming apparatus S. More specifically, as illustrated in FIG. 5B, when the distance between the stacking portion 5 and an end of the antenna surface 22 adjacent to the center in the W direction in the image forming apparatus S is L1, the inner side of the stacking portion 5 in the W direction is "+", and the outer side thereof is "−", the end of the antenna surface 22 is arranged in a location where L1>0 and where the antenna surface 22 partially overlaps the stacking portion 5. However, part of the antenna surface 22 is arranged outside the stacking portion 5 on the "−" side in the W direction. Thus, even if the recording medium P discharged from the image forming apparatus S is stacked on the stacking portion 5, at least part of the antenna surface 22 is in a location that does not overlap the recording medium P on the stacking portion 5. Accordingly, satisfactory communication can be established.

As illustrated in FIG. 5B, the exposure unit 2 is connected to cables 3 for use in transmitting a relatively high frequency signal for enabling the exposure unit 2 to emit light based on image data transmitted from the image data processor (not illustrated). If the cables 3 are near the communication portion 31, the relatively high frequency signal passing through the cables 3 may cause noise that would affect the communication portion 31. In contrast, in the present embodiment, the communication portion 31 is arranged such that the direction in which the cables 3 extend (direction substantially extending along the W direction) is parallel or substantially parallel to the longitudinal direction of the antenna surface 22 (direction substantially extending along the W direction). Arranging the antenna surface 22 in this orientation can provide a sufficient distance between the antenna surface 22 and the cables 3, can reduce effects of noise, and can easily maintain satisfactory communication performance.

The operation panel 6 is arranged on a side opposite the antenna surface 22 such that the stacking portion 5 is disposed therebetween. Thus, the location of the antenna surface 22 and that of the operation panel 6 do not interfere with each other, and satisfactory operability and viewability of the operation panel 6 can be achieved.

Figure 13:
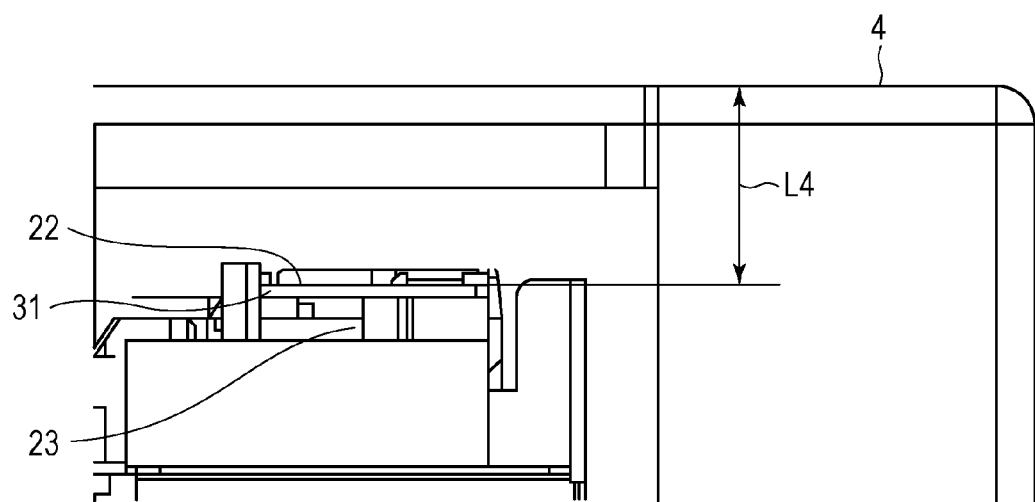
FIG. 13 is a cross-sectional view taken along line XIII-XIII in FIG. 4A.

The arrangement of the communication portion 31 in the vertical direction of the image forming apparatus S is described next. FIG. 13 is a cross-sectional view taken along line XIII-XIII in FIG. 4A. The distance L4 between the upper section of the cover 4 and the antenna surface 22 in the vertical direction is approximately 1 mm, at which near field communication can be established when a device that is to communicate with the image forming apparatus S has moved to a position approximately 20 mm away from a region above the outer surface of the upper section of the cover 4 over the antenna surface 22.

[Arrangement of Icon 29]

Figure 12A:
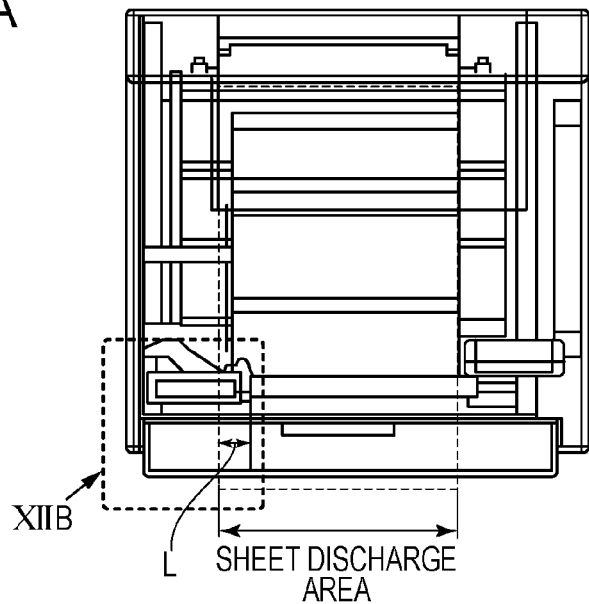
FIG. 12A is a top view of the image forming apparatus when the upper section of the cover is assumed to be transparent.
Figure 12B:
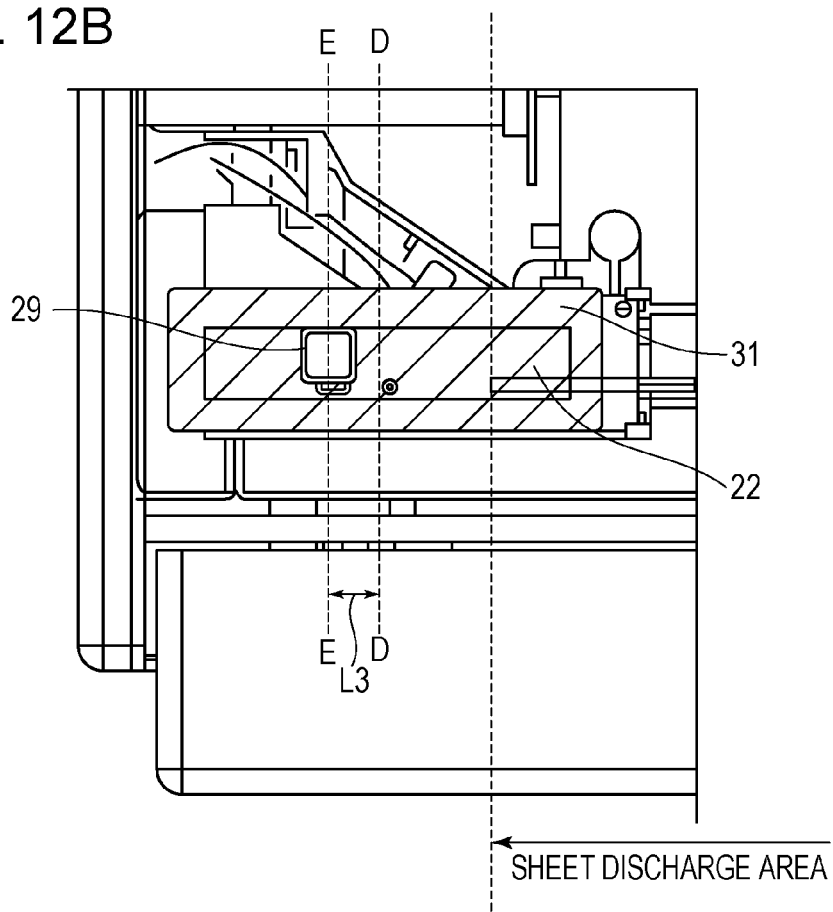
FIG. 12B is an enlarged view of an antenna surface and its surroundings.

A positional relationship between the icon 29 and the antenna surface 22 is described next. FIG. 12A is a top view of the image forming apparatus S when the upper section of the cover 4 is assumed to be transparent. FIG. 12B is an enlarged view of the antenna surface 22 and its surroundings. The icon 29 is a mark indicating where a user passes a communication portion (mobile terminal 28 (see FIGS. 11B and 11C)) that is to communicate with the image forming apparatus S to use the near field communication function. In FIG. 12B, the line D-D indicates the center line of the antenna surface 22 in the width direction, and the line E-E indicates the center line of the icon 29 in the width direction. In the present embodiment, the icon 29 and the antenna surface 22 for use in near field communication are arranged in positions where the distance L3 between the line D-D and the line E-E is 5 mm. When the communication portion that is to communicate with the image forming apparatus S is positioned above the upper section of the cover 4, even if that communication portion is outside the region facing the antenna surface 22, which has a size of approximately 50 mm by approximately 25 mm, communication can be established as long as that communication portion is in a range where the distance between the end of the antenna surface 22 and that communication portion is approximately 20 mm or less. Arranging the icon 29 in a position deviating from the center of the antenna surface 22 in a direction away from the stacking portion 5, as described above, have advantages over arranging the icon 29 such that the distance L3 is zero. These advantages are described below. First, there is a reduced possibility that when the recording medium P is discharged while a user passes a communication portion that is to communicate with that image forming apparatus S over the icon 29, the discharged recording medium P would collide with the communication portion (e.g., mobile terminal 28) or the user's hand. Second, even if the recording medium P is misaligned on the stacking portion 5, the possibility that the recording medium P would hide the icon 29 is reduced. Third, there is a reduced possibility that when many recording media Ps are stacked on the stacking portion 5, the icon 29 would be hard to see because it is hidden by one or more of the recording media Ps on the stacking portion 5, thus increasing visual recognizability of the icon 29.

[Structure of Holding Communication Portion 31]

Figure 6A:
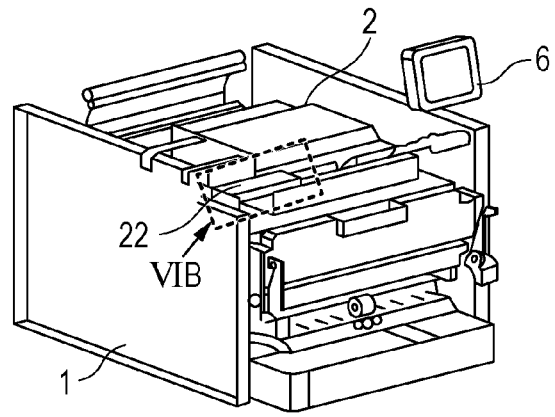
FIG. 6A is a front perspective view of the image forming apparatus when the cover is removed.
Figure 6B:
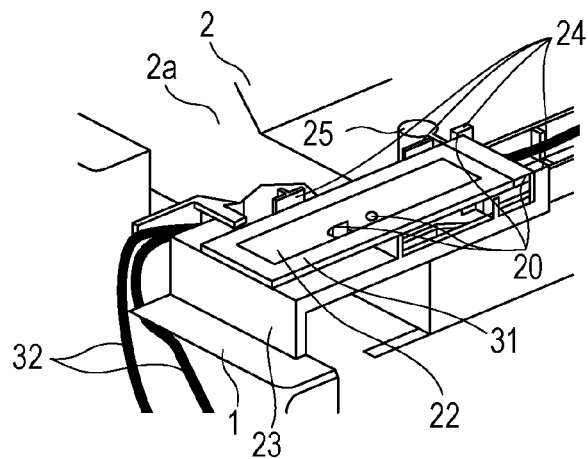
FIG. 6B is an enlarged view of a communication portion and its surroundings.
Figure 6C:
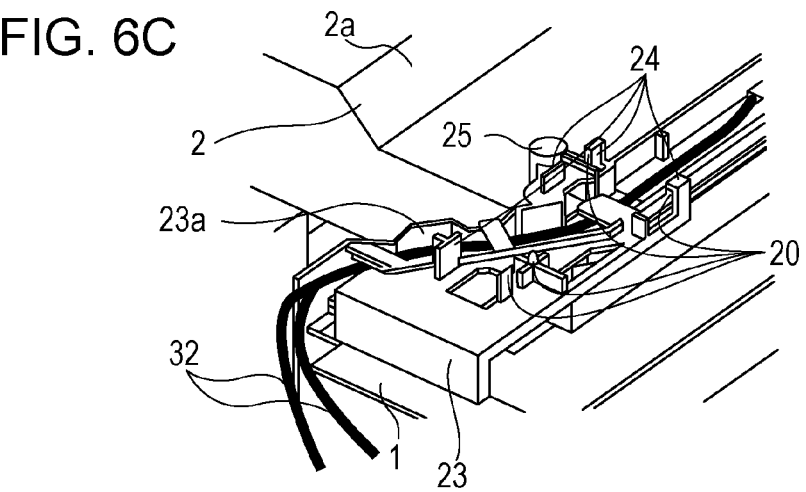
FIG. 6C is an enlarged view of a holding member and its surroundings when the communication portion is removed.
Figure 7A:
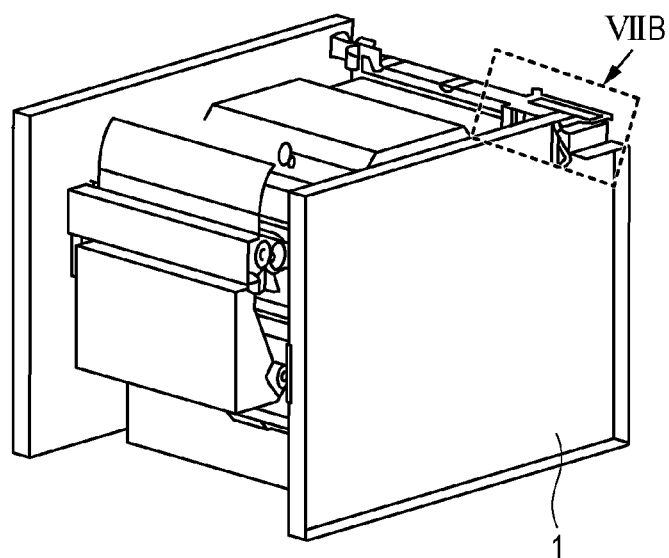
FIG. 7A is a rear perspective view of the image forming apparatus when the cover is removed.
Figure 7B:
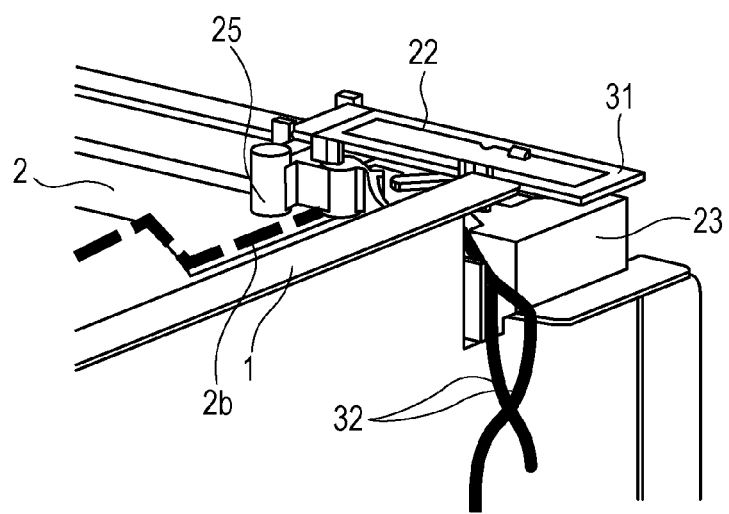
FIG. 7B is an enlarged view of the communication portion and its surroundings.

A structure of holding the communication portion 31 including the antenna surface 22 is described next. FIG. 6A is a front perspective view of the image forming apparatus S when the cover 4 is removed. FIG. 6B is an enlarged view of the communication portion 31 and its surroundings. FIG. 6C illustrates a state where the communication portion 31 is removed. FIG. 7A is a rear perspective view of the image forming apparatus S when the cover 4 is removed. FIG. 7B is an enlarged view of the communication portion 31 and its surroundings.

A frame 1 of the main body of the apparatus supporting the image forming portion is disposed on the cover 4 inside the main body of the image forming apparatus S. The frame 1 is made of a metal side plate and stay. The communication portion 31 is arranged in a position a certain distance or more away from the metal frame 1, which is a metal member inside the image forming apparatus S, to achieve satisfactory communication performance of the antenna surface 22. Specifically, a holding member 23 is attached to the frame 1, and the holding member 23 holds the communication portion 31. The holding member 23 includes holding shaped portions 20 for positioning the communication portion 31 to prevent detaching of the communication portion 31. Holding the communication portion 31 on the holding member 23 supported by the frame 1 in such a way can maintain a constant distance between the antenna surface 22 and the frame 1 in particular with respect to the direction of the normal to the antenna surface 22 and can achieve satisfactory communication performance.

As illustrated in FIG. 6C, the holding member 23 includes a cable guiding portion 23a for regulating the position of cables 32. The cable guiding portion 23a sets the cables 32 in a space below the communication portion 31 held by the holding shaped portions 20 and above the frame 1. This enables the cables 32 to be arranged in the space between the frame 1 and the communication portion 31 provided to have a distance between the communication portion 31 and the frame 1. As a result, the image forming apparatus S can be miniaturized. The cables 32 are used in transmitting signals for controlling a motor, solenoid, and other components. The signals passing through the cables 32 have frequencies lower than those of signals passing through the previously described cables 3. Thus, there is little effect of noise on the antenna surface 22.

Protrusions 24 (see FIG. 6C) are disposed in a plurality of locations around the communication portion 31 held by the holding shaped portions 20 in the holding member 23. The holding member 23 includes a contact portion 25 capable of coming into contact with a housing 2a of the exposure unit 2. The structure of the protrusions 24 and the contact portion 25 can prevent breakage of the communication portion 31.

The protrusions 24 protrude above the communication portion 31 (toward the upper section of the cover 4) and are positioned in the vicinity of a region facing the communication portion 31 in the upper section of the cover 4. Thus, even if the upper section of the cover 4 is deformed and bent downward by external forces, because the protrusions 24 come into contact with the cover 4, the communication portion 31 can be prevented from being broken by the cover 4 coming into contact with the antenna surface 22 or other sections of the communication portion 31. If the upper section of the cover 4 is bent downward (toward the side opposite to the upper section of the cover 4) by external forces, the holding member 23 receives forces from the cover 4 through the protrusions 24. At this time, a region remote from the frame 1 in the holding member 23 is deformed because the region cannot let the forces escape to the frame 1. To address this, if the holding member 23 is deformed, the contact portion 25, which is disposed in a position remote from the frame 1, comes into contact with the housing 2a of the exposure unit 2. This enables the forces from the cover 4 exerted on the holding member 23 to escape to the exposure unit 2. Accordingly, the forces from the cover 4 can be prevented from being received by the holding member 23 alone, deformation of the holding member 23 can be reduced, and breakage of the holding member 23 can be suppressed. The contact portion 25 can come into contact with a region 2b indicated by the dotted line in FIG. 7B. The region 2b faces the edge of the side wall of the housing 2a in the exposure unit 2. The contact portion 25 is arranged in a position approximately 1 mm to 2 mm away from the top of the housing 2a of the exposure unit 2 when forces from the cover 4 are not exerted on the holding member 23.

COMPARATIVE EXAMPLES

Figure 1:
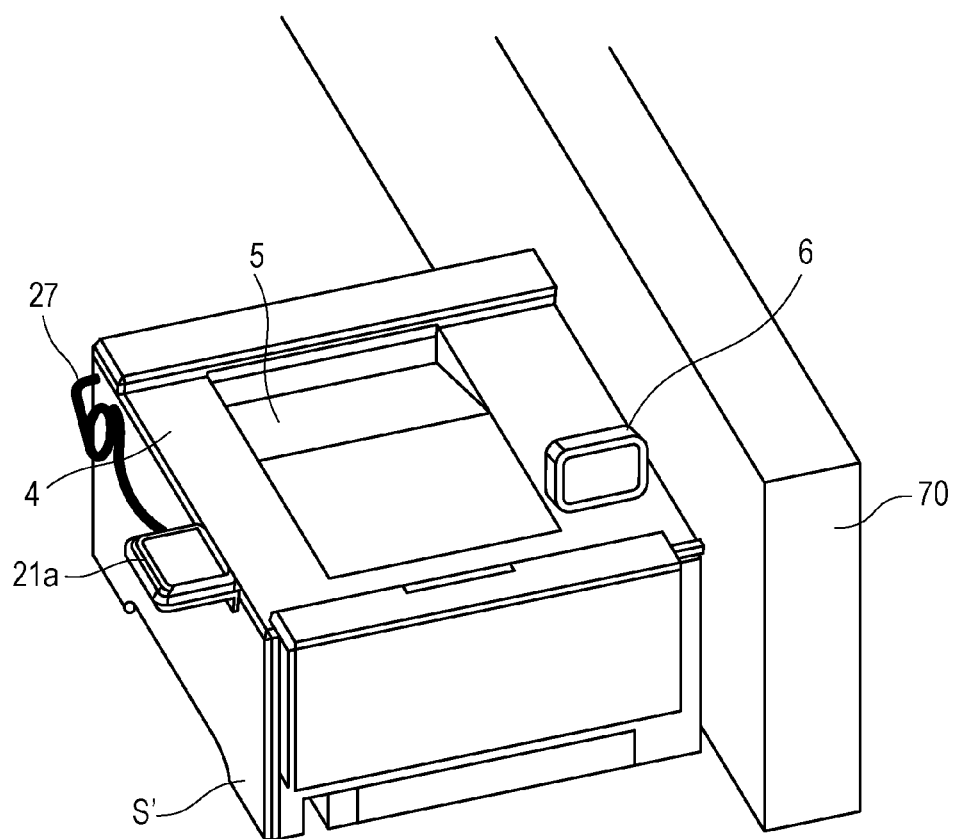
FIG. 1 is a perspective view of an image forming apparatus according to a first comparative example.
Figure 2:
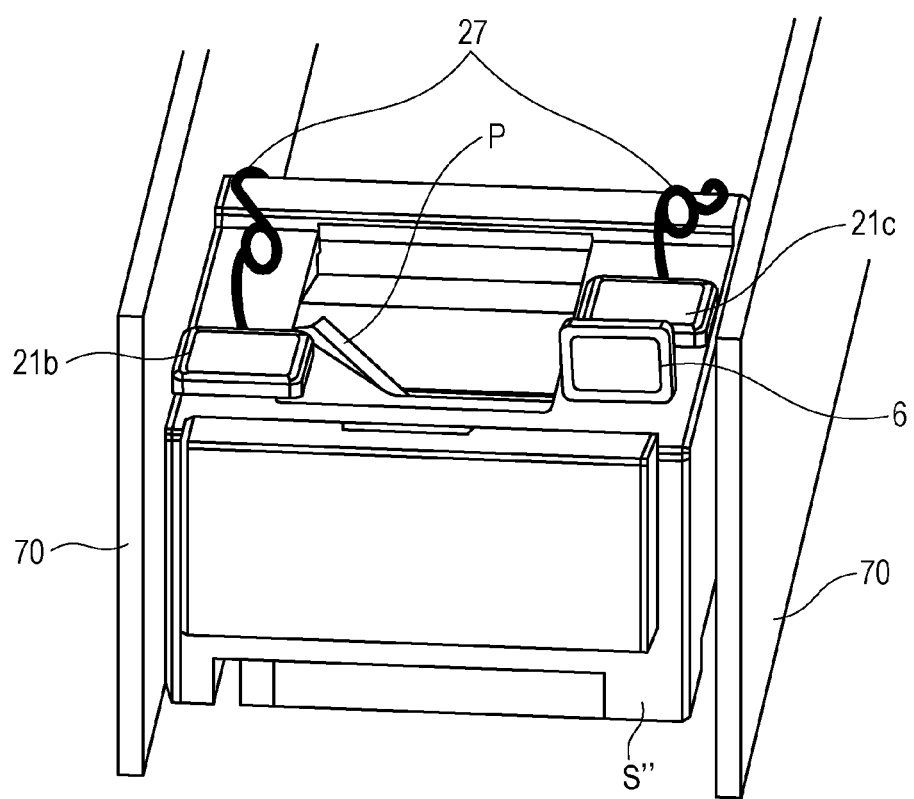
FIG. 2 is a perspective view of an image forming apparatus according to a second comparative example.

Next, the embodiment is compared with comparative examples. FIG. 1 is a perspective view of an image forming apparatus S' according to a first comparative example. FIG. 2 is a perspective view of an image forming apparatus S" according to a second comparative example. FIGS. 1 and 2 each illustrate the image forming apparatus with an external communication portion 21 for near field communication. When the external communication portion 21 is attached, there are disadvantages described below.

As illustrated in FIG. 1, when a wall 70 is present on the right of the image forming apparatus S', the external communication portion 21 can be arranged in a position indicated by reference numeral 21a, which is on the left as seen from the front of the apparatus. However, because the communication portion 21 projects from the outer surface of the main body, the area occupied by the image forming apparatus S' is increased.

One approach to addressing this issue is arranging the communication portion 21 in a position indicated by reference numeral 21b or 21c on the upper section of the cover 4, as illustrated in FIG. 2, to allow the image forming apparatus S" to be placed in a space in which the walls 70 are present on both side. However, in the case of the apparatus having a small area of the upper section of the cover 4, when the communication portion 21 is arranged in a position that overlaps the stacking portion 5 for receiving discharged recording media Ps, as illustrated in the position 21b, the communication portion 21 may interfere with discharging the recording media Ps. If the communication portion 21 is arranged in the position 21c to avoid interference with discharging the recording media Ps, because the communication portion 21 is arranged behind the operation panel 6, it is difficult for a user to pass a communication portion that is to communicate with the image forming apparatus S" over the communication portion 21, and viewability may be unsatisfactory.

When the external communication portion 21 is used, a cable 27 for connecting to the main body of the image forming apparatus is needed. This may require a complicated process of binding the cable 27 or may degrade the external appearance.

In contrast, when the communication portion 31 is arranged inside the cover 4, as in the above-described present embodiment, the communication portion 31 does not protrude from the outer surface, does not interfere with discharging the recording medium P, or does not decrease viewability of the operation panel 6. In addition, this arrangement does not lead to degradation in the external appearance, and handling the cables can be relatively simplified.

According to the present embodiment, as described above, the communication portion for establishing near field communication is arranged inside the cover 4 in the main body of the image forming apparatus S such that the antenna surface 22 faces the upper section of the cover 4, and the communication portion can communicate with another communication portion passed above the upper section of the cover 4 using near field communication. This enables the communication portion to be appropriately arranged in the image forming apparatus while at the same time achieving satisfactory communication performance and usability. In addition, arrangement of the antenna surface 22 in a position that is downstream in the direction of discharging the recording medium P (E direction) on the upper section of the cover 4 and that at least partially faces the region outside the stacking portion 5 in the width direction of the apparatus (W direction) achieves more satisfactory viewability, operability, and communication performance.

Second Embodiment

A second embodiment is described next. The same reference numerals are used in the configuration substantially the same as that in the first embodiment, and the detailed description thereof is omitted.

[Arrangement of Communication Portion 31]

Figure 8A:
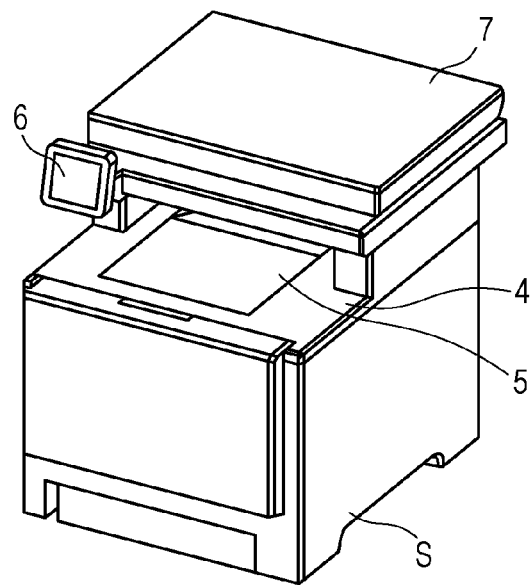
FIG. 8A is a perspective view of the image forming apparatus.
Figure 8B:
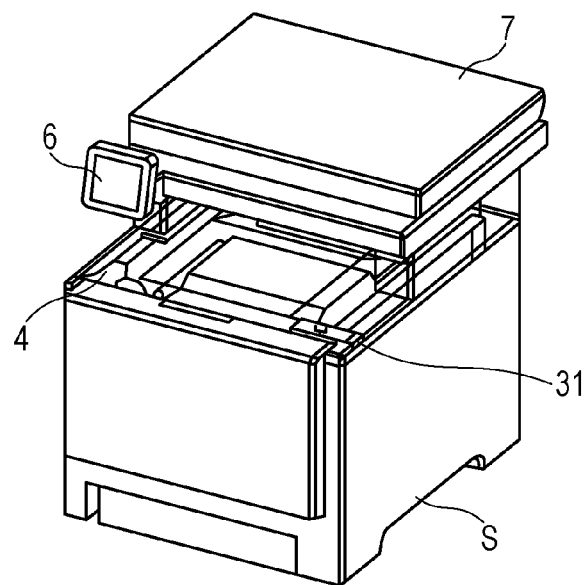
FIG. 8B illustrates the image forming apparatus in FIG. 8A when the cover is assumed to be transparent.
Figure 9A:
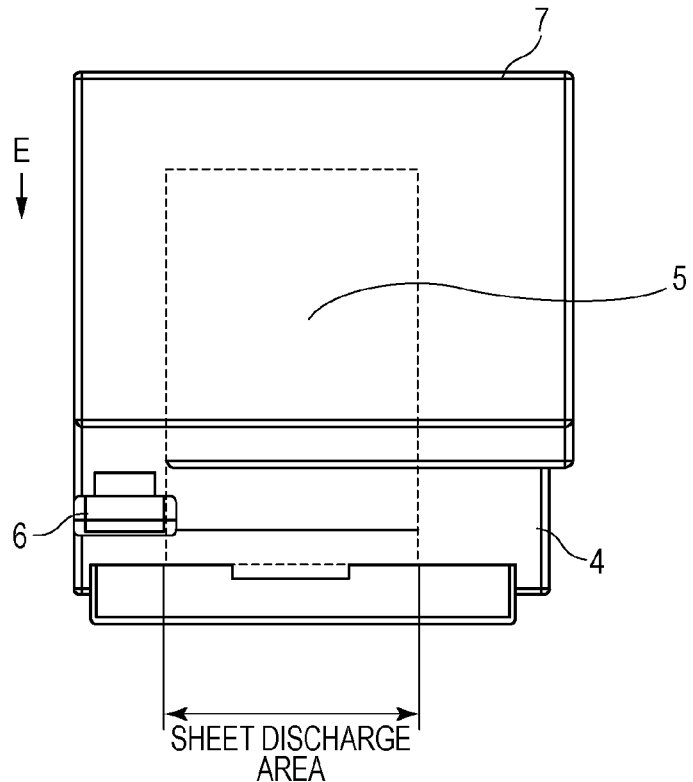
FIG. 9A is a top view of the image forming apparatus.
Figure 9B:
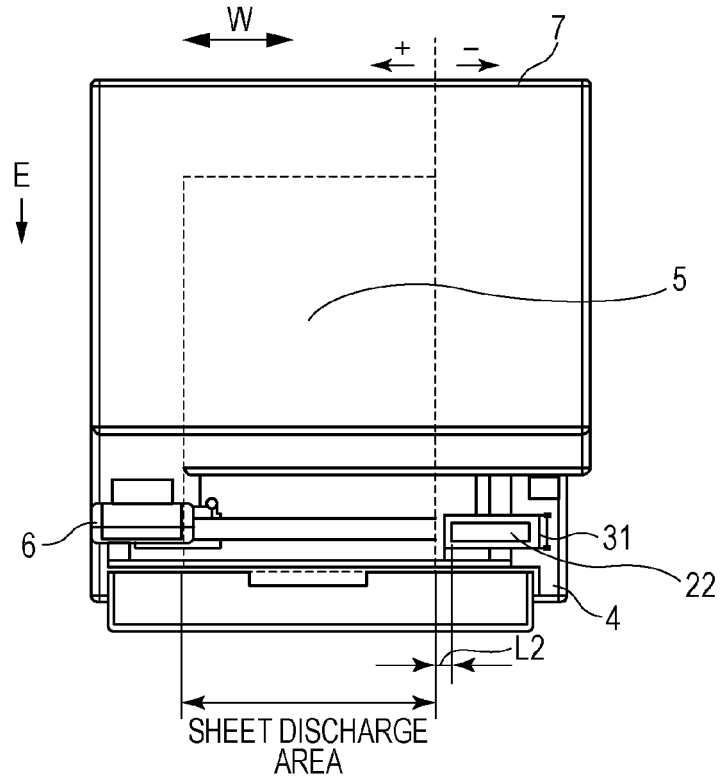
FIG. 9B illustrates the image forming apparatus in FIG. 9A when the cover is assumed to be transparent.

FIG. 8A is a perspective view of the image forming apparatus S. FIG. 8B illustrates the image forming apparatus S in FIG. 8A when the cover 4 is assumed to be transparent. FIG. 9A is a top view of the image forming apparatus S. FIG. 9B illustrates the image forming apparatus S in FIG. 9A when the cover 4 is assumed to be transparent. In the present embodiment, an image reading portion 7 configured to read an image on an original is supported above the upper section of the cover 4, the operation panel 6 is supported on the left side as seen from the front of the apparatus, and the communication portion 31 is disposed on the inner side of the upper section of the cover 4 on the right side as seen from the front of apparatus. The image read by the image reading portion 7 can be formed on the recording medium P by the image forming portion.

As illustrated in FIG. 9B, with respect to the width direction of the image forming apparatus (W direction), the inner direction in the sheet discharge area is defined as "+" direction, the outer direction in the sheet discharge area is defined as "−" direction, and the distance between the sheet discharge area, which is the stacking portion 5 in the upper section of the cover 4, and the inner end of the antenna surface 22 in the width direction is defined as L2.

In this case, the antenna surface 22 is arranged in a position where L2<0 and is fully arranged outside the stacking portion 5 in the W direction. Because the antenna surface 22 is arranged downstream of the end of the image reading portion 7 in the direction of discharging the recording medium P (E direction), even when the image reading portion 7 is disposed, the antenna surface 22 is not easily hidden by the image reading portion 7, and a user can readily pass a communication portion that is to communicate with the image forming apparatus, such as the mobile terminal 28, over the communication portion 31.

[Structure of Holding Communication Portion 31]

Figure 10A:
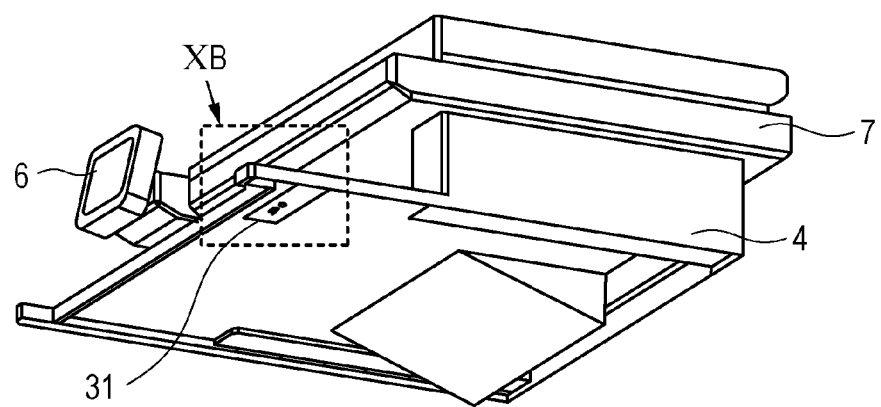
FIG. 10A illustrates the upper section of the cover seen from the inside (below)
Figure 10B:
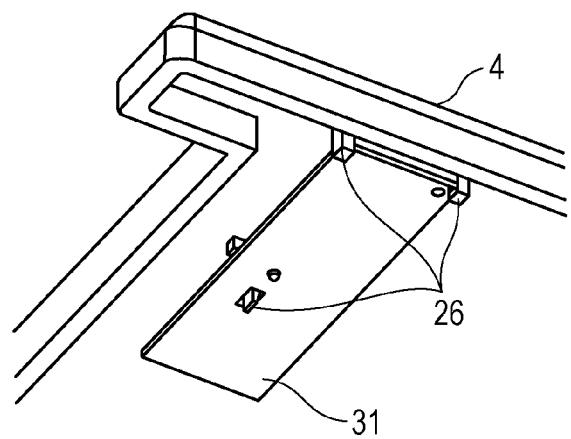
FIG. 10B is an enlarged view of the communication portion and its surroundings in FIG. 10A.

A structure of holding the communication portion 31 is described next. FIG. 10A illustrates the upper section of the cover 4 seen from the inside (below). FIG. 10B is an enlarged view of the communication portion 31 and its surroundings in FIG. 10A. In the present embodiment, the communication portion 31 is held by holding shaped portions 26 disposed on the upper section of the cover 4. Holding the communication portion 31 on the upper section of the cover 4 in such a way enables a relative positional relationship between the icon 29 (see FIG. 11A) on the upper section of the cover 4 and the antenna surface 22 to be set more precisely than that when it is set through the holding member 23 in the first embodiment. The antenna surface 22 can be closer to the upper section of the cover 4 than that when the communication portion 31 is held by the holding member 23 supported by the frame 1 in the first embodiment. Accordingly, when the communication portion 31 has substantially the same performance as that in the first embodiment, the distance over which near field communication can be established with reference to the surface portion of the upper section in the cover 4 can be further increased.

As described above, the present embodiment can provide substantially the same advantageous effects as in the first embodiment. The communication portion can be appropriately arranged in the image forming apparatus while at the same time satisfactory communication performance and usability are achieved. Holding the communication portion 31 on the upper section of the cover 4 enables the distance over which near field communication can be established with reference to the surface portion in the upper section of the cover 4 to be longer than that in the first embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus comprising:
   an image forming portion;
   a cover configured to cover the image forming portion;
   a communication portion for use in establishing near field communication, the communication portion being arranged on an image forming portion side of an upper section of the cover;
   a display disposed on the upper section of the cover, and configured to display at least information relating to the image formation;
   a mark provided on the upper section of the cover and indicating a position of the communication portion; and
   an image reading portion configured to read an image on an original,
   wherein a recording medium having an image formed by the image forming portion is discharged on the upper section of the cover,
   wherein the mark is provided outside an area where the recording medium is discharged, of the upper section of the cover in a direction intersecting with a discharging direction of the recording medium and is provided downstream of an end of the image reading portion in the discharging direction of the recording medium, and
   wherein the mark is provided at a position being opposite to the display portion such that the recording medium discharged on the upper section of the cover is disposed therebetween.

2. The image forming apparatus according to claim 1, wherein the communication portion is disposed below the mark in a vertical direction of the image forming apparatus.

3. The image forming apparatus according to claim 1, wherein the communication portion includes an antenna for use in establishing the near field communication, the antenna at least partially being disposed outside the recording medium discharged on the upper section of the cover in the direction that intersects with the discharging direction of the recording medium.

4. The image forming apparatus according to claim 1, wherein the communication portion includes an antenna for use in establishing the near field communication, the antenna entirely being disposed outside the recording medium discharged on the upper section of the cover, in the direction that intersects with the discharging direction of the recording medium.

5. The image forming apparatus according to claim 4, wherein the communication portion is held by the cover on the image forming portion side of the upper section of the cover.

6. The image forming apparatus according to claim 1, further comprising:
   a frame disposed on the image forming portion side of the upper section of the cover; and
   a holding member holding the communication portion, and including a protrusion protruding towards the upper section of the cover,
   wherein the holding member is attached to the frame, and the protrusion is configured to contact the image forming portion side inside the upper section of the cover when the upper section of the cover is deformed by external force.

7. The image forming apparatus according to claim 6, wherein the image forming portion comprises a photosensitive member configured to hold a toner image and an exposure unit configured to expose the photosensitive member, and the holding member includes a contact portion capable of coming into contact with the exposure unit when the holding member is bent in a vertical direction of the image forming apparatus.

8. The image forming apparatus according to claim 1, wherein the communication portion is capable of communicating with a communication portion of a device which passes over the mark using near field communication.

9. The image forming apparatus according to claim 1, wherein the near field communication is ISO/IEC 18092, ISO/IEC 21481, Felica.RTM., or MIFARE.RTM.

10. An image forming apparatus comprising:
    an image forming portion;
    a cover configured to cover the image forming portion;
    a stacking portion disposed in an upper section of the cover and configured to receive a recording medium thereon, the recording medium having an image formed by the image forming portion and being discharged;
    a communication portion for use in establishing near field communication, the communication portion being arranged on an image forming portion side of an upper section of the cover;
    a display disposed on the upper section of the cover, and configured to display at least information relating to the image formation;
    a mark provided on the upper section of the cover and indicating a position of the communication portion; and
    an image reading portion configured to read an image on an original,
    wherein the mark is provided outside the stacking portion in a direction intersecting with a discharging direction of the recording medium and is provided downstream of an end of the image reading portion in the discharging direction of the recording medium, and
    wherein the mark is provided at a position being opposite to the display portion such that the stacking portion is disposed therebetween.

11. The image forming apparatus according to claim 10, wherein the communication portion is disposed below the mark in a vertical direction of the image forming apparatus.

12. The image forming apparatus according to claim 10, wherein the communication portion includes an antenna for use in establishing the near field communication, the antenna at least partially being disposed outside the stacking portion in the direction intersecting with the discharging direction of the recording medium.

13. The image forming apparatus according to claim 10, wherein a center line in a width direction of the mark in the direction intersecting with the discharging direction of the recording medium is arranged farther away than a center line of a width direction of the antenna in a distance from the stacking portion.

14. The image forming apparatus according to claim 10, further comprising:
    a frame disposed on the imaging forming portion side of the upper section of the cover; and
    a holding member holding the communication portion, and including a protrusion protruding towards the upper section of the cover,
    wherein the holding member is attached to the frame, and the protrusion is configured to contact the image forming portion side of the upper section of the cover when the upper section of the cover is deformed by external force.

15. The image forming apparatus according to claim 14, wherein the image forming portion comprises a photosensitive member configured to hold a toner image and an exposure unit configured to expose the photosensitive member, and the holding member includes a contact portion capable of coming into contact with the exposure unit when the holding member is bent in a vertical direction of the image forming apparatus.

16. The image forming apparatus according to claim 10, wherein the communication portion includes an antenna for use in establishing the near field communication, the antenna entirely being disposed outside the stacking portion in the direction perpendicular to the discharging direction of the recording medium.

17. The image forming apparatus according to claim 16, wherein the communication portion is held by the cover on the image forming portion side of the upper section of the cover.

18. The image forming apparatus according to claim 10, wherein the communication portion is capable of communicating with a communication portion of a device which passes over the mark using near field communication.

19. The image forming apparatus according to claim 10, wherein the near field communication is ISO/IEC 18092, ISO/IEC 21481, Felica.RTM., or MIFARE.RTM.

20. An image forming apparatus comprising:
    an image forming portion;
    a cover configured to cover the image forming portion;
    a communication portion for use in establishing near field communication, the communication portion being arranged on an image forming portion side of an upper section of the cover;

a display portion configured to display at least information relating the image formation; and a mark provided on the upper section of the cover and indicating a position of the communication portion, wherein a recording medium having an image formed by the image forming portion is discharged on the upper section of the cover, and in a direction that intersects with a discharging direction of the recording medium, the mark is provided at a position being opposite to the display portion such that the recording medium discharged on the upper section of the cover is disposed therebetween, and being outside the recording medium.

21. The image forming apparatus according to claim 20, wherein the communication portion is disposed below the mark in a vertical direction of the image forming apparatus.

22. The image forming apparatus according to claim 20, wherein the communication portion includes an antenna for use in establishing the near field communication, the antenna at least partially being disposed outside the recording medium discharged on the upper section of the cover in the direction intersect with the discharging direction of the recording medium.

23. The image forming apparatus according to claim 20, wherein the communication portion includes an antenna for use in establishing the near field communication, the antenna entirely being disposed outside the recording medium discharged on the upper section of the cover in the direction intersect with the discharging direction of the recording medium.

24. The image forming apparatus according to claim 23, wherein the communication portion is held by the cover on the image forming portion side of the upper section of the cover.

25. The image forming apparatus according to claim 20, wherein the display portion is disposed on the upper section of the cover.

26. The image forming apparatus according to claim 25, wherein the mark is arranged downstream of the display portion in the discharging direction of the recording medium.

27. The image forming apparatus according to claim 20, further comprising:
an image reading portion configured to read an image on an original, wherein the mark is arranged downstream of an end of the image reading portion in the discharging direction of the recording medium.

28. The image forming apparatus according to claim 20, wherein the communication portion is capable of communication with a communication portion of a device which passes over the mark using near field communication.

29. The image forming apparatus according to claim 20, wherein the near field communication is ISO/IEC 18092, ISO/IEC 21481, Felica (registered trademark), or MIFARE (registered trademark).

30. An image forming apparatus comprising:
an image forming portion;
a cover configured to cover the image forming portion;
a stacking portion disposed on an upper section of the cover and configured to receive a recording medium thereon, the recording medium having an image formed by the image forming portion and being discharged;
a communication portion arranged for use in establishing near field communication, the communication portion being arranged on an image forming portion side of an upper section of the cover;

a display portion configured to display at least information relating to the image formation; and a mark provided on the upper section of the cover and indicating a position of the communication portion, wherein the mark is provided in a position being opposite to the display portion such that the stacking portion is disposed therebetween and being outside the stacking portion in a direction intersecting with a discharging direction of the recording medium.

31. The image forming apparatus according to claim 30, wherein the communication portion is disposed below the mark in a vertical direction of the image forming apparatus.

32. The image forming apparatus according to claim 30, wherein the communication portion includes an antenna for use in establishing the near field communication, the antenna at least partially being disposed outside the stacking portion in the direction intersecting with the discharging direction of the recording medium.

33. The image forming apparatus according to claim 30, wherein a center line in a width direction of the mark in the direction intersecting with the discharging direction of the recording medium is arranged farther away than a center line of a width direction of the antenna in a distance from the stacking portion.

34. The image forming apparatus according to claim 30, further comprising:
a frame disposed on the image forming portion side of the upper section of the cover; and
a holding member holding the communication portion, wherein the holding member is attached to the frame.

35. The image forming apparatus according to claim 34, wherein
the holding member includes a protrusion protruding towards the upper section of the cover, and
the protrusion is configured to contact the image forming portion side of the upper section of the cover when the upper section of the cover is deformed by external force.

36. The image forming apparatus according to claim 34, wherein
the image forming portion comprises a photosensitive member configured to hold a toner image and an exposure unit configured to expose the photosensitive member, and
the holding member includes a contact portion capable of coming into contact with the exposure unit when the holding member is bent in a vertical direction of the image forming apparatus.

37. The image forming apparatus according to claim 30, wherein the communication portion includes an antenna for use in establishing the near field communication, the antenna entirely being disposed outside the stacking portion in the direction perpendicular to the discharging direction of the recording medium.

38. The image forming apparatus according to claim 37, wherein the communication portion is held by the cover on the image forming side of the upper section of the cover.

39. The image forming apparatus according to claim 30, wherein the display portion is disposed on the upper section of the cover.

40. The image forming apparatus according to claim 39, wherein the mark is arranged downstream of the display portion in the discharging direction of the recording medium.

41. The image forming apparatus according to claim 30, further comprising an image reading portion configured to read an image on an original, wherein the mark is arranged downstream of an end of the image reading portion in the discharging direction of the recording medium.

42. The image forming apparatus according to claim 30, wherein the communication portion is capable of communicating with a communication portion of a device which passes over the mark using near field communication.

43. The image forming apparatus according to claim 30, wherein the near field communication is ISO/IEC 18092, ISO/IEC 21481, Felica (registered trademark), or MIFARE®.

44. An image forming apparatus comprising:
an image forming portion;
a cover configured to cover the image forming portion and having a plurality of holding portions, the plurality of holding portions arranged on an image forming portion side of an upper section of the cover;
a communication portion arranged inside the upper section of the cover, and arranged on the image forming portion side of the upper section of the cover, the communication portion being held by the plurality of holding portions and having an antenna for use in establishing near field communication being ISO/IEC 18092, ISO/IEC 21481, Felica (registered trademark), or MIFARE®;
a display portion configured to display at least information relating the image formation; and
a mark provided on the upper section of the cover and indicating a position of the communication portion,
wherein a recording medium having an image formed by the image forming portion is discharged on the upper section of the cover, and
in a direction that intersects with a discharging direction of the recording medium, the mark is provided at a position being opposite to the display portion such that the recording medium discharged on the upper section of the cover is disposed therebetween, and being outside the recording medium.

45. The image forming apparatus according to claim 44, wherein the communication portion is disposed below the mark in a vertical direction of the image forming apparatus.

46. The image forming apparatus according to claim 44, wherein the antenna at least partially being disposed outside the recording medium discharged on the upper section of the cover in the direction intersect with the discharging direction of the recording medium.

47. The image forming apparatus according to claim 44, wherein the antenna entirely being disposed outside the recording medium discharged on the upper section of the cover in the direction intersect with the discharging direction of the recording medium.

48. The image forming apparatus according to claim 44, wherein the display portion is disposed on the upper section of the cover.

49. The image forming apparatus according to claim 48, wherein the mark is arranged downstream of the display portion in the discharging direction of the recording medium.

50. The image forming apparatus according to claim 44, further comprising:
an image reading portion configured to read an image on an original,
wherein the mark is arranged downstream of an end of the image reading portion in the discharging direction of the recording medium.

51. The image forming apparatus according to claim 44, wherein the communication portion is capable of communication with a communication portion of a device which passes over the mark using near field communication.

52. An image forming apparatus comprising:
an image forming portion;
a cover configured to cover the image forming portion and having a plurality of holding portions, the plurality of holding portions arranged on the image forming portion side of an upper section of the cover;
a stacking portion disposed on the upper section of the cover and configured to receive a recording medium thereon, the recording medium having an image formed by the image forming portion and being discharged;
a communication portion arranged inside the upper section of the cover, and arranged on the image forming portion side of the upper section of the cover, the communication portion being held by the plurality of holding portions and having an antenna for use in establishing near field communication being ISO/IEC 18092, ISO/IEC 21481, Felica (registered trademark), or MIFARE®;
a display portion configured to display at least information relating to the image formation; and
a mark provided on the upper section of the cover and indicating a position of the communication portion,
wherein the mark is provided in a position being opposite to the display portion such that the stacking portion is disposed therebetween and being outside the stacking portion in a direction intersecting with a discharging direction of the recording medium.

53. The image forming apparatus according to claim 52, wherein the communication portion is disposed below the mark in a vertical direction of the image forming apparatus.

54. The image forming apparatus according to claim 52, wherein the antenna at least partially being disposed outside the stacking portion in the direction intersecting with the discharging direction of the recording medium.

55. The image forming apparatus according to claim 52, wherein a center line in a width direction of the mark in the direction intersecting with the discharging direction of the recording medium is arranged farther away than a center line of a width direction of the antenna in a distance from the stacking portion.

56. The image forming apparatus according to claim 52, wherein the antenna entirely being disposed outside the stacking portion in the direction perpendicular to the discharging direction of the recording medium.

57. The image forming apparatus according to claim 52, wherein the display portion is disposed on the upper section of the cover.

58. The image forming apparatus according to claim 57, wherein the mark is arranged downstream of the display portion in the discharging direction of the recording medium.

59. The image forming apparatus according to claim 52, further comprising an image reading portion configured to read an image on an original, wherein the mark is arranged downstream of an end of the image reading portion in the discharging direction of the recording medium.

60. The image forming apparatus according to claim 52, wherein the communication portion is capable of communicating with a communication portion of a device which passes over the mark using near field communication.

* * * * *